United States Patent [19]

Albrecht

[11] 4,096,215
[45] Jun. 20, 1978

[54] DEVICE FOR APPLYING GAS TO A LIQUID
[75] Inventor: Erhard Albrecht, Dusseldorf, Germany
[73] Assignee: Messer Griesheim GmbH, Frankfurt am Main, Germany
[21] Appl. No.: 717,881
[22] Filed: Aug. 26, 1976
[30] Foreign Application Priority Data
  Sep. 13, 1975 Germany .......................... 2540845
[51] Int. Cl.² ............................................... B01F 3/04
[52] U.S. Cl. ............................ 261/121 R; 137/859; 210/221 P; 251/22; 261/119 R; 261/120; 261/DIG. 27
[58] Field of Search ............... 261/121 R, 121 M, 122, 261/123, 119 R, 87, 93, 64 R, 65, DIG. 27, DIG. 75; 210/219, 220, 221 P, 7, 169; 43/56, 57; 119/3, 5; 251/22, 53, 61, 61.1; 137/843, 859

[56] References Cited
U.S. PATENT DOCUMENTS

| 1,447,336 | 3/1923 | Baughman | 261/120 X |
| 1,550,057 | 8/1925 | Beeler | 261/120 |
| 2,598,207 | 5/1952 | Bailey et al. | 251/61.1 X |
| 3,121,975 | 2/1964 | Duhamel | 119/5 X |
| 3,320,928 | 5/1967 | Smith | 43/57 X |
| 3,542,524 | 11/1970 | Kimble et al. | 261/121 M X |
| 3,547,811 | 12/1970 | McWhirter | 210/7 |
| 3,794,303 | 2/1974 | Hirshon | 261/123 X |
| 3,819,054 | 6/1974 | Long et al. | 210/221 P X |
| 4,000,227 | 12/1976 | Garrett | 261/123 X |

Primary Examiner—Tim R. Miles
Assistant Examiner—Richard L. Chiesa
Attorney, Agent, or Firm—Ernest F. Marmorek

[57] ABSTRACT

The device for introducing a gas into a liquid by supplying gas to a gas introducing means located on the bottom of a tank in which the liquid is being held, and collecting the gas above the liquid after it passes through the liquid. A closure for the tank acts to collect the gaseous substances which pass upwardly out of the liquid by adjusting the volume of enclosed space above the liquid level. A means is also provided for removing at least some of the gaseous substances which have accumulated in the enclosed space above the liquid and reintroducing them into the supply being introduced into the liquid at the bottom of the tank.

5 Claims, 2 Drawing Figures

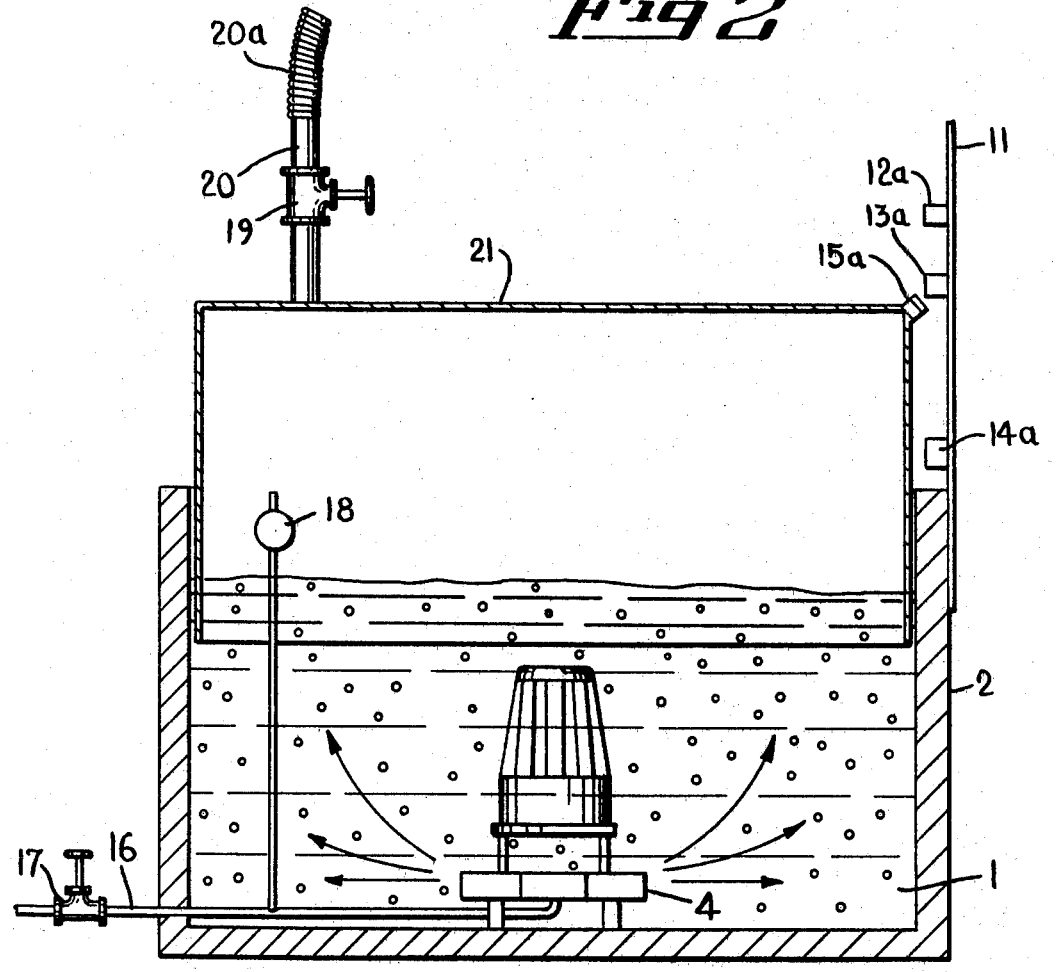

DEVICE FOR APPLYING GAS TO A LIQUID

BACKGROUND OF THE INVENTION

The invention relates to a device for introducing gas into a liquid which is contained in a tank or similar container. The invention relates more particularly to such a device which is especially suitable for the oxygen treatment of water containing sewage sludge or similar waste products, which would be normally reacted with oxygen as part of the purification thereof. The gas to be introduced, for this application, may be oxygen or an oxygen containing gaseous substance. It is, however, not intended to limit the invention to sewage treatment applications nor to oxygen or oxygen containing gaseous substances.

An especially advantageous feature of the instant invention permits recirculation of gaseous substances which pass out of the liquid, back into the gas supply to the device introducing the gaseous substance into the liquid.

There are a number of methods and devices at present in use for operations such as waste water sludge purification, wherein the material to be treated is aerated. Those methods which utilize a closed tank normally teach aeration by means of a hollow shafted stirrer through which the gas can flow into the liquid, or by means of surface mounted impellers. Such devices and methods are known, for example, from the German disclosures AS 2,032,480 and OS 2,146,403.

In any operation, the tank closure must meet certain requirements in order to ensure the non-objectionable operation of the aerating device. Some of these are:

The closure must at least provide a substantially gas-tight seal to prevent the loss of gases from the tank. The closure must be easily removable to permit cleaning of the tank. Corrosion resistance of the cover material is another important feature, in terms of maintenance of the device. Finally, the closure must be able to withstand the pressure of the expanding volume of the gas which forms above the liquid, as a result of the gases being introduced into the liquid and percolating up and out of the liquid level. This last feature not only ensures the gas-tight integrity of the device, but also enables oxygen recycling, by a gas withdrawal device disposed above the liquid for re-introducing the oxygen, thereby permitting more efficient use of oxygen which has passed unreacted through the liquid.

SUMMARY OF THE INVENTION

It is accordingly among the principal objects of the invention to provide a tank closure or seal which meets all of the above-noted requirements.

Further objects and advantages of the invention will be set forth in part in the following specification and in part will be obvious therefrom without being specifically referred to, the same being realized and attained as pointed out in the claims hereof.

Other objects of the invention will in part be obvious and will in part appear hereinafter.

With the above and other objects of the invention in view, the invention consists in the novel construction, arrangement and combination of various devices, elements and parts, as set forth in the claims hereof, certain embodiments of the same being illustrated in the accompanying drawings and described in the specification.

The invention accordingly comprises the features of construction, combination of elements and arrangement of parts which will be exemplified in a construction hereinafter set forth and the scope of the application of which will be indicated in the claims.

In general, the device includes a tank for receiving and holding the liquid, a tank closure having the features noted above, and a gas introducing means extending to a point below the normal liquid level, for introducing gaseous substances into the liquid.

To meet the above requirements for the closure, it has been found that a sheet of plastic material such as the synthetic plastic material used in low pressure inflatable building structures, is well suited. The material can be placed over the top of the holding tank and will inflate as gas accumulates under pressure within the tank. In smaller tanks, it is possible to use a bell-shaped device, open at the bottom, which is partially submerged in the liquid. The gaseous substance can then collect in the upper portion of the bell-shaped device.

As the tank closure physically adapts itself to the gas volume in the tank, the physical change in the cover position can be utilized to control the gas delivery to the gas introducing device. This will be more clearly brought out below and in the claims.

BRIEF DESCRIPTION OF THE DRAWINGS

For a fuller understanding of the nature and objects of the invention, reference should be had to the following detailed description taken in combination with the accompanying drawings, in which:

FIG. 2 is a sectional view similar to FIG. 1 showing a modification wherein the closure is rigid and bell-shaped.

DESCRIPTION OF THE PREFERRED EMBODIMENTS

Figure 1:
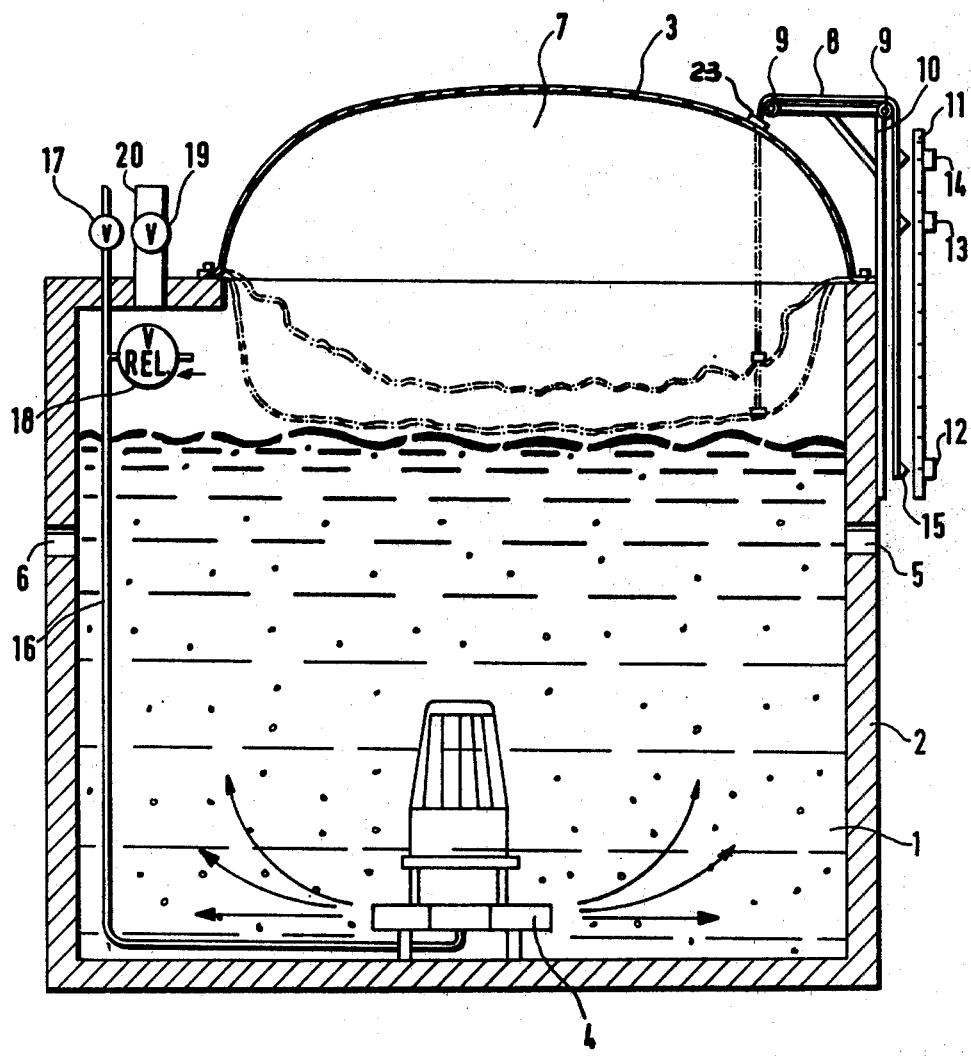
FIG. 1 is a vertical sectional view of a device in accordance with the instant invention wherein the closure is a flexible sheet of material.

In carrying the invention into effect in the embodiments which have been selected for illustration in the accompanying drawing and for description in the specification, and referring now particularly to FIG. 1, a tank 2, which may be of any suitable size or shape, contains the liquid 1 into which gas is to be introduced. A tank closure, such as a flexible sheet 3, is secured across the top of the tank 2 and forms a gas-tight seal with the tank 2. A gas introducing means such as a submersible aerating or bubbling device 4 extends below the normal level of the liquid 1 to introduce gaseous substances into the liquid. The preferred location of such a device is near the bottom of the tank 2 as shown in FIG. 1.

The liquid 1 may be moved into and out of the tank through the openings 5,6 that are formed through the walls of the tank 2.

An enclosed space or chamber 7 is formed above the liquid level by the flexible sheet 3. The flexible sheet 3 is inflated by gaseous substances which pass out of the liquid 1.

A counter-weighted rope 8 is secured to the sheet 3. The rope 8 passes over rollers 9 which are mounted on a cantilever 10. As shown in FIG. 1, the rope 8 has a portion that extends along the side of the tank 2 near a graduated scale 11. At various positions along the graduated scale 11, there are mounted contact switches 12, 13 and 14. The weight 15 which is secured to the rope 8, is operable to activate the contact switches as it passes over them. For the embodiment shown, switch 12 controls the oxygen or oxygen containing gas supply which passes through conduit 16, by means of the servo controlled valve 17. Gaseous substances are also supplied to the conduit 16 and subsequently to the submersible aerating device, through the one-way valve 18. One-way valve 18 also serves to prevent gaseous substances flowing through the conduit 16, from flowing directly into chamber 7.

The contact switch 13 opens exhaust valve 19 in the exhaust gas nozzle 20.

The third contact switch 14 acts to close exhaust valve 19 and open valve 17 to allow the introduction of additional outside gaseous substances.

The modification shown in FIG. 2 is similar to that as shown in FIG. 1 except that the tank closure is a bell 21. For same parts there are used the same numbers. The bell 21 consists for instance of synthetic material. The contact switches 12a, 13a and 14a are activated by a pin 15a, fixed on bell 21. The contact switches 12a, 13a and 14a have to be mounted in opposite series compared to the device of FIG. 1, as for instance when the volume of gas in bell 21 becomes greatest, the highest contact switch 12a has to be activated.

The exhaust gas nozzle 20 is installed on the bell 21 and has annexed a flexible pipe 20a to enable the exhaust gases to be eliminated without interaction by the vertical movement of bell 21. The exhaust gas nozzle 20 also may be installed inside the container 2, similar to one-way valve 18. Other arrangements would be obvious to a person of ordinary skill in the art.

Operation

The operation of the above described embodiments of the invention is as follows:

With reference to FIG. 1, gaseous substances are supplied to the submersible aerating device 4 through conduit 16, by the opening of valve 17. This causes the oxygen or oxygen containing gas to enter the chamber 7 after percolating through the liquid 1. In practice, about 20% of the oxygen is normally dissolved in the liquid 1. Undissolved gas bubbles out of the liquid and is contained in the chamber 7. The weighted rope which is secured to the flexible sheet 3 passes over the rollers 9 and moves downwardly to the position at contact switch 12 shown in FIG. 1. The weight 15 activates contact switch 12 which closes valve 17. At this point in the operation, gas is removed from the chamber 7 through the one-way valve 18 and is circulated back through the liquid 1 through the submersible aerating device 4. As more and more oxygen is taken up by the liquid, the flexible sheet 3 begins to collapse. Steel plates 23 or other weights may be used to force the flexible sheet 3 to collapse as the gas is used up.

As the flexible sheet 3 collapses, the weight 15 is pulled up the graduated scale 11 until the contact switch 13 is activated. Contact switch 13 causes the exhaust valve 19 to open and the remaining gaseous substances in the enclosed space or chamber 7 can exhaust through exhaust conduit 20. It has been found by experience that if there is only about 30 - 50% of the original volume left in the enclosed space 7, only about 10% of the initial oxygen is left and it becomes more practical to exhaust the system and start the cycle again with pure oxygen. It is this consideration which controls the positioning of the contact switch 13.

When the flexible sheet 3 has substantially completely collapsed, the weight 15 passes over the contact switch 14. Contact switch 14 closes the exhaust valve 19 and opens the valve 17 to allow the flexible sheet to be once again inflated. For this embodiment, the opening of exhaust valve 19 by switch 13, should be suppressed during inflation of the flexible sheet 3. Otherwise the exhaust valve 19 will open and exhaust the chamber 7 at the wrong stage of the process. Means for suppressing the opening of valve 19 are well known and are usually incorporated into the switch construction or switch wiring circuit.

The operation of the device as shown in FIG. 2 is substantially identical with that of the device of FIG. 1. The bell 21 may move up and down in the tank as the gas pressure increases or decreases within the enclosed space or chamber 7a. In practice, it has been found that because of the considerable weight of the bell 21, its use in any but the smaller tanks becomes impractical. The use of a flexible sheet 3 is preferable for large tanks because of its light weight and ease of handling.

I wish it to be understood that I do not desire to be limited to the exact details of construction shown and described, for obvious modifications will occur to a person skilled in the art. In this regard, it is especially noted that the control device used need not be the mechanical devices shown in FIG. 1, that is, the weighted rope 8 and the switches 12, 13 and 14 which are tripped by the weight 15. As it is the height of the flexible sheet which is measured, a simple device utilizing photocells and a light beam could easily be employed. It is also possible to control the various valves 17, 18, 19 either manually or electronically using an actual quantitative analysis of the amount of oxygen in the gaseous substance contained in the enclosed space 7, 7a, to trigger the valve 17, 18, 19.

The device, as disclosed, above meets all of the originally set forth advantages. The use of synthetic plastic materials for the flexible sheet results in a light weight closure which is relatively non-reactive. The use of oxygen is maximized in a process utilizing a device according to the instant invention, as would be the use of other reactive gases in processes wherein a liquid must be reacted with the gases in large quantities, when the instant device is used for other than oxygenating processes.

The device according to the instant invention is rather simple and offers extremely simple regulatory possibilities for the process of introducing gases into a liquid. Special constructions are not required and the modification of presently used tanks to conform with the instant invention, would not be difficult. When the submersible aerating device 4 is placed on the bottom of the tank, a constant flow, with highest velocity at the bottom of the tank, is formed. This has the added advantage of preventing sedimentation on the bottom of the tank 2, undesirable in most applications. Finally, in the event of an explosion, the light construction of the closure using a flexible sheet 3, permits the explosion to be vented upwardly without being contained within the tank.

Having thus described the invention, what I claim as new and desire to be secured by Letters Patent, is as follows:

1. A device for introducing a gas into a liquid, especially water containing waste products,
  comprising, in combination,
  a tank having a relatively large surface for receiving and holding the liquid;
  a tank closure means operable to effect a substantially gas-tight closure of the tank and operative to define with the liquid level an enclosed space above the level;

first valve means including gas introducing means extending to a point below the normal liquid level for introducing gaseous substances into the liquid, said tank closure means comprising a sheet of flexible inflatable material being operable to form a bubble so as to collect gaseous substances which pass upwardly out of the liquid, to adjust the volume of said enclosed space above the level and thereby to adjust to the amount of gaseous substances held in said enclosed space, second valve means including means operable for removing at least some of the gaseous substances accumulated in said space to supply them to said gas introducing means, third valve means including an exhaust valve communicating with said space and operable for venting said space; and switch means to control at least some of said valve means in response to the inflation and deflation respectively, of said bubble.

2. A device, as claimed in claim 1, wherein said tank closure means collects gaseous substances by inflating to form a bubble, further including switch means to control at least some of said valve means in response to the inflation and deflation, respectively, of said bubble.

3. A device, as claimed in claim 2, wherein said switch means comprises a first switch operable to close said first valve means;

a second switch operable to open said third valve means; and a third switch operable to open said first valve means and close said third valve means, said first switch being activated when the bubble is in a substantially fully inflated condition, said second switch being activated when said bubble has deflated a predetermined amount; and said third switch being activated when said bubble is in a relaxed deflated condition.

4. A device for introducing a gas into a liquid, comprising, in combination, a tank for receiving and holding the liquid;

a tank closure means operable to form a substantially gas-tight closure above the liquid contained in the tank and operative to define with the liquid level an enclosed space above the level;

first valve means including gas introducing means extending to a point below the normal liquid level for introducing gaseous substances into the liquid, said tank closure means comprising a sheet of flexible material and being operable to collect gaseous substances by inflating to form a bubble, said gaseous substances passing upwardly out of the liquid, at least a portion of said closure means being movable to adjust the volume of said enclosed space above the level and thereby to adjust to the amount of gaseous substances held in said enclosed space, second valve means including means operable for removing at least some of the gaseous substances accumulated in said space to supply them to said gas introducing means, third valve means including an exhaust valve communicating with said space and operable for venting said space and switch means to control at least some of said valve means in response to the inflation and deflation, respectively, of said bubble, said switch means comprising:

a first switch operable to close said first valve means;

a second switch operable to open said third valve means; and a third switch operable to open said first valve means and close said third valve means, said first switch being activated when the bubble is in a substantially fully inflated condition, said second switch being activated when said bubble has deflated a predetermined amount, and said third switch being activated when said bubble is in a relaxed deflated condition.

5. A device as claimed in claim 4, wherein said flexible material is a synthetic polymeric material.

* * * * *